United States Patent Office 2,739,421
Patented Mar. 27, 1956

2,739,421

METHOD OF PREVENTING OBSTRUCTION OF THE SAP-STREAM IN BEECHWOOD

Gustav-Dietrich Kraemer, Munich, Germany, assignor to Allgemeine Holzimprägnierung G. m. b. H., Sinzheim, near Baden-Baden, Germany, a firm No Drawing. Application July 10, 1952, Serial No. 298,210

3 Claims. (Cl. 47—57.5)

The clogging of the vessels in beechwood (wood of plants of the genus Fagus in Germany) and the obstruction of the vessels in analogue wood, which behave like the specimen of said genus, i. e. that generally do not get heart wood prior to felling, is caused by a penetration of medullary ray parenchym into the vessels of the wood, which are thereby closed. The result is, that the later saturation of the wood with impregnating substances is obstructed. The inflation of parenchym is caused by entrance of air in the vessels after felling.

The formation of tyloses, i. e. the parenchym-particles, which close the vessels, was discovered by Robert Hartig and described as obstruction. In the later literature the term "clogging" was sometimes used and with the term "obstruction" being reserved for fungus-blight. We use intentionally the first term, which has the right of priority being given by the discoverer of these phenomena.

A number of methods have been developed to prevent these phenomena, which are economically very injurious. These known methods are either directed to the ineffective prevention of fungus-blight, or to the prevention of the entrance of air. A comprehensive literature exists about these methods, which exclusively try to prevent the phenomenon by acting from the outside.

The new method is distinguished from the methods heretofore known in that the wood-parenchyms of the living or of the felled tree trunk are destroyed by the introduction of antibiotic amalgamations and thereby an obstruction of the vessels is made impossible. The wood is therefore prevented from changing after the felling. The formation of tyloses and thereby the clogging of the wood vessels is avoided by the quick destruction of the living parenchym in the wood with the aid of toxical highly effective antibiotics. The novelty of the method lies in the destruction of the cause of the obstruction. Redeeming influences appearing later on, which had to be kept off by former methods, can have no more influence, the parenchym being already dead.

The introduction of the substances having antibiotic action can be carried out in any manner which permits a quick distribution. Above all, permeation by means of the sap-stream of the living tree is one way of carrying out the new method. The distribution of chemical substances through the sap-stream is broadly known. Various kinds of substances can be used to destroy the parenchym. As ingredients of such preparation are mentioned, for example, sodium chlorate, higher alcohols, formaldehyde, hydrochloric acid, trichlorphenol, trichloroacetic acid, chloral hydrate and many others. The composition of the particular preparation must be proportioned according to the specific purpose.

The new method can be carried out, for instance, as follows:

For preventing the obstruction of the wood vessels in a living beechwood-trunk with a content of about 2 m.$^3$, a complete destruction of all living parenchym can be attained by introducing a quantity of 6 kg. of a compound consisting of 80% of sodium chlorate, 10% of chloral hydrate and 10% of a trihydric alcohol. The introduction may be carried out by simply injecting the compound in borings in the tree trunk, the tree distributing the compound through its sap-stream in a perfect manner.

What I claim is:

1. A method of preventing obstruction of the vessels of beechwood and the like through the growth of wood parenchym in the tree which comprises boring a transverse hole in the living tree trunk into the sapwood of the tree, then injecting a solution containing a parenchym antibiotic into the hole for distribution throughout the tree by the sap-stream, said solution comprising a mixture of a trihydric alcohol, an alkali chlorate and a chlorinated hydrate.

2. A method of preventing obstruction of the vessels of beechwood and the like through the growth of wood parenchym in the tree which comprises boring a transverse hole in the living tree trunk into the sapwood of the tree, then injecting a solution containing a parenchym antibiotic into the hole for distribution throughout the tree by the sap-stream, said solution consisting of 80% sodium chlorate, 10% chloralhydrate and 10% trihydric alcohol.

3. A method for preventing the growth of parenchym in beechwood and similar woods which do not form heartwood before felling which comprises forming a transverse bore in the tree trunk into the sapwood of the trunk, then injecting a mixture of parenchym antibiotic agents selected from the group consisting of sodium chlorate, trihydric alcohols, formaldehyde, hydrochloric acid, trichlorophenol, trichloroacetic acid and chloralhydrate into the bore for distribution throughout the trunk by the sapstream thereof.

References Cited in the file of this patent

UNITED STATES PATENTS

| | | |
|---|---|---|
| 1,740,484 | Von Behr | Dec. 24, 1929 |
| 2,324,968 | White | July 20, 1943 |
| 2,334,556 | Howard | Nov. 16, 1943 |

OTHER REFERENCES

J. Chem. Soc. (London), Abstracts, vol. 102, part 2, p. 476 (1912).

Washington (D. C.) Star, November 1, 1924, p. 16, cols. 4 and 5.

Roach: "Plant Injection for Diagnostic and Curative Purposes," pub. 1938 in England, in Imperial Bureau of Horticulture and Plantation Crops Technical Communication No. 10, page 13.

Carter: "Chemicals and Methods . . . by Injections," mimeographed February 1939 as Paper E–467 by U. S. Dept. Agr. Entom. and Plant Quarantine, pages 6, 13, 16, 17.